Patented Feb. 4, 1930

1,745,657

UNITED STATES PATENT OFFICE

HERMANN BECKMANN, OF BERLIN-ZEHLENDORF, GERMANY

RUBBER SUBSTANCE AND PROCESS OF MAKING SAME

No Drawing. Application filed July 1, 1925, Serial No. 40,953, and in Germany August 22, 1924.

My invention refers to an improved rubber substance and to a process of making same.

The invention has for its chief object to produce a new rubber substance or rubber in a new or improved condition in which it is capable of passing liquids while preventing the entrance of solid matter even though it be in a state of fine subdivision. A substance of this kind which is at the same time resistive against the action of acids and the electrolytic action of the electric current is needed for instance in electrolytic cells and in storage batteries for purposes which will be dealt with further hereinafter.

Heretofore a variety of processes has been proposed for producing rubber in porous condition and the products obtained were of a spongy or foamy character. Such products were obtained for instance by incorporating with a plastic or ordinary rubber mix volatile or gas forming substances which on the application of heat strive to escape from the plastic mass and so give rise to a porous or cellular formation. However, the spongy rubber thus obtained has comparatively large pores and cavities which besides absorbing water and other liquids will also allow solid matter to pass through. In consequence thereof spongy rubber as hitherto manufactured is not adapted for use in the form of comparatively thin plates or diaphragms capable of allowing a liquid to pass through while securely preventing the passage of all solid matter suspended in such liquid. I have now ascertained that a porous rubber product which has filtering properties similar to those of blotting paper or the like is obtained by treating a rubber solution and preferably a rubber suspension such as latex with means whereby the emulsion or suspension is converted into a jelly-like mass, and thereafter subjecting the rubber-constituent of such mass to curing—as by vulcanization—in the presence of moisture, as more fully hereinafter explained.

As is well known latex will on the addition of an acid as in usual practice be coagulated in such manner that the liquid is separated in large measure from the solid matter which tends to solidify altogether and has no porosity worth speaking of. According to the present invention means must be employed which do not cause the water contained in latex to separate from the rubber and which still transform the watery suspension of rubber called latex into an elastic jelly, care being taken to avoid the addition of substances which might cause the mass to swell or larger pores or cavities to be formed therein.

Transformation of the latex-emulsion (in which rubber particles or globules constitute a disperse phase) into a jelly-like mass involves a reconstruction of the rubber constituent into a colloidal net in which the water constituent is enmeshed, both the rubber mesh and the water being sinuously continuous from one boundary of the jelly to the other. Such reciprocal, recticular, matrix relationship between constituents is the known characteristic of jelly-structure.

The transformation of latex and the like into an elastic jelly may be obtained by means of watery solutions of magnesium salts or the soluble salts of the alkaline earths or other dyad metals. I have further ascertained that certain gaseous products such as sulphur dioxide and acetic acid vapors when superposed to a body of latex so as to remain in contact therewith effectively accomplish jelly-formation from latex. For instance if a salt solution of the kind aforesaid is added to latex or rubber emulsion, without acids or other substances conditioned and adapted to cause water-extrusion or separative coagulation, a product is formed which either has a jelly-like consistency or soon assumes it. Heat acts towards accelerating the process. According to the quantity of water used in the salt solution added the consistency of this product can be varied and the product thus obtained can easily be moulded or cast prior to the assumption of jelly-like consistency.

In order to subsequently effect vulcanization of the rubber in the form it has assumed in the jelly-like structure I prefer adding to the latex together with the salt solution some sulphur or other vulcanizing ingredients, and if necessary also products which accelerate vulcanization.

I may, however, also expose the surface of a body of latex or the like to contact with sulphur dioxide or the like, finely subdivided sulphur being previously added to ensure vulcanization.

As already pointed out, mutual exclusion of water and rubber is to be avoided, and conditions favorable to the formation of a jelly comprising the characteristic colloidal net structure, are to be established; to this end temperature conditions should be regulated, as is usual in dealing with colloidal phenomena and relationship.

In practising my invention I may for instance proceed as follows:—

*Example 1.*—To 100 ccms. of normal latex being a watery suspension of rubber containing about 35% rubber in fine subdivision are added 2 grs. of finely subdivided sulphur. To this mixture are added under stirring 5 ccms. of a solution of magnesium sulphate saturated at normal temperature, this salt solution being diluted with 190 ccms. water. After the lapse of about two minutes (if the temperature be about 25° C.) the mixture thickens and after about fifteen minutes it is converted into an elastic jelly-like product. Before the mixture has set in this manner it is poured into suitable moulds. For instance if it is desired to make separators for storage batteries I prefer pouring it into a flat dish. The jelly is allowed to stand until it has stiffened, this taking place after the lapse of a few days. If it is desired to effect stiffening in a shorter time the jelly-like mass is dipped in or immersed in dilute acid or in alcohol which is subsequently removed by washing with water. The mass thus obtained is now subjected to vulcanization, the mould containing the mass or this latter by itself (after having been placed on a carrier such as for instance fabric) being introduced in the vulcanization vessel where it is heated in a well known manner during about 2½ hours at a pressure of 6 kgs. per ccm². Care must be taken to effect vulcanization either in air which is highly charged with water vapours or below water, the rubber product being completely covered by the water. The reason for vulcanizing in a water environment is, that restraint of evaporation of the water, its retention in the mesh of the colloidal net of rubber, prevents collapse of the meshes of that net upon each other and conserves the net or mesh form while the curing process is going on and until that process has, in the well-known manner altered the physical character of the rubber substance, rendering the rubber mesh form permanent and no longer liable to internal adhesions which, had they been allowed to occur before curing, would have altered the structural form of the rubber constituent of the jelly and destroyed the continuity of the water constituent enmeshed in the colloidal net. I may in the alternative expose the jelly, if this has been prepared without admixture of vulcanizing agents, to the alternate action of hydrogen sulphide and sulfurous acid. After vulcanization the product is ready for immediate use.

Instead of magnesium sulphate I may as well employ other soluble magnesium salts or salts of an alkaline earth metal, for instance barium rhodanide, 8 ccms. of a solution, saturated in the cold, of this compound being the equivalent of the quantity of magnesium sulphate used in accordance with the above example.

*Example 2.*—100 grams latex, to which have been added 12 grams flowers of sulfur and 30 ccms. of a 5% solution of calcium chloride to thicken the latex and to thereby keep the sulphur in suspension, are exposed in a closed vessel to the action of sulphur dioxide gas which is introduced into the vessel so as to replace the air previously contained therein and to be superposed to the body of latex contained in the vessel, remaining in contact with its surface. The progressive transformation to a jelly-like form becomes initially manifest after a few minutes, provided the mixture be quite cool, say about 5° C., and after the lapse of 2–3 hours the whole mass is converted into an elastic jelly which is then exposed to the action of heat and moisture for vulcanization.

*Example 3.*—To a mixture of 100 grams latex and 6 grams flowers of sulphur are added 200 ccms. of a solution of 16.7 grams magnesium sulphate in 1000 ccms. water. The whole preferably at a temperature about 5° C. is then exposed to the action of sulphur dioxide gas, as above described, and the jelly-like mass which results in this treatment, is exposed to heat in the presence of moisture for vulcanization.

The jelly-forming as well as the vulcanization ingredients used must be such as do not develop gases or vapors adapted to cause the formation of larger pores or cavities in the rubber.

If greater quantities of sulphur are added to the mixture a product can be obtained which while having a mechanical strength equalling that of ordinary hard rubber is still capable of passing liquids and of extruding such liquid when compressed.

The product thus obtained is porous rubber, the pores being of a microscopic character invisible to the eye, but perfectly permeable to liquids such as water, glycerine or the like, which render the rubber as highly permeable as high quality blotting paper, the capillary action of the minute pores causing the liquid to be absorbed also in those parts of the product which are not immersed in the liquid. In view of this high capillarity the new product is also adapted for use as a filter and further as a wick, for instance in the lubrication of parts of machinery. The liquid absorbed is extrudible by application of pressure. The new product is further adapted for use in the manufacture of bandages and the like.

The new product is particularly useful for the manufacture of separators or diaphragms employed in storage batteries (accumulators), electrolytic vessels and the like where the diaphragm or separator is required to offer a passage to the electrolyte without creating a high electric resistance. As the new product consists wholly or largely of pure vulcanized rubber, it resists the action of all kinds of acids and other corrosive substances and is equally resistive against electrolytic action.

Its electric properties are very remarkable: a sheet of porous rubber according to the present invention having a thickness of about 1 mm., when impregnated with highly conductive sulphuric acid, showed a resistance per square decimetre of about .002 ohm, whereas the separators hitherto used which consisted of wood of the highest quality freed from all impurities by extraction showed a minimum resistance of .004 ohm.

When employing sheets made of the new product as separators or diaphragm for accumulators I can arrange the separator in the accumulator in such manner that it partly or entirely envelops the plate. The sheets are preferably formed with ribs or corrugations, and insertions of all sorts including fabric can be provided therein.

I may impregnate the separator with wood extract, phenols or the like in order to improve the electric properties of the accumulator in a manner similar to that of the wooden separators hitherto used.

The salient characteristics of the herein described invention are, conversion of a latex into a jelly-like mass, and curing (as by vulcanization) the rubber constituent thereof while the water constitutent is retained, so that, after cure, the rubber, though its physical properties have been changed in the manner well known to result from a cure, retains the structural form, or volumetric distribution, which it assumed as an incident to the formation of a jelly. Curing under conditions which ensure retention of all, or practically all, the water constituent of the jelly is therefore significant; these conditions are represented by curing the material under water, or in an equivalent environment which restrains escape of the water included in the jelly.

The formation of a jelly from a disperse system of the emulsion type, involves a structural transformation or redistribution of one component of such system into a colloidal net, the meshes of which are joined, and form sinuous uninterrupted connection in all directions from one boundary of the jelly to another, the three-dimensional colloidal net including interstitially in its mesh the other component of the original emulsion system; this included component being, like the mesh of the net, uninterruptedly extensive along the sinuous paths between net-meshes, from one boundary to the other of the jelly-mass, in all directions. In form, both components are nets; either net is, spacially, the matrix of the other, and in the net-structure, neither constituent is truly a disperse phase, both are continuous in similar reticulous aspects. The rubber-water jelly, herein described, constitutes such a reciprocally reticulous structure; curing the colloidal net of rubber while its net form is conserved—as by keeping its interstices filled or distended with an intervenor, as represented by the reticularly interstitial water, between the rubber meshes produces a cured rubber body in the form of a colloidal net and therefore containing included pores which spacially and relatively to the rubber body, correspond to the water which was included in the rubber-water jelly.

The expression latex contained herein as descriptive of materials to which this invention may be applied, is intended to include not only the natural latex of rubber trees such as *Hevea brasiliensis*, and the juices from which balata and gutta percha are derived, but also artificially prepared latexes or emulsions of similar characteristics such as those obtained by colloidizing various coagulated rubbers.

I wish it to be understood that I do not desire to be limited to the exact substances, quantities, temperatures and sequence of operations above described, for obvious modifications will occur to a person skilled in the art.

I claim:—

1. The method of making porous rubber comprising treating latex with sulphur dioxide gas and with another means capable of coagulating the caoutchouc in the form of a jelly containing substantially all the water causing such jelly to solidify in such manner that substantially all the water is retained therein and vulcanizing said jelly in the presence of moisture and a vulcanizing ingredient.

2. The method of making porous rubber comprising treating latex with a solution of a salt of a dyad metal and sulphur dioxide gas in such manner as to retain in the jelly obtained substantially all the water contained therein.

3. The method of making porous rubber comprising treating latex with a solution of a salt of a dyad metal in such manner as to retain in the jelly obtained substantially all the water contained therein and vulcanizing said jelly in the presence of moisture.

4. The method of making porous rubber comprising treating latex with a solution of a salt of a dyad metal and sulphur dioxide gas in such manner as to retain in the jelly obtained substantially all the water contained therein and vulcanizing said jelly in the presence of moisture.

5. The method of making porous rubber comprising treating a mixture of latex, sulphur and a thickening medium with sulphur dioxide gas in such manner as to form a jelly containing substantially all the water and subjecting the jelly thus obtained to vulcanization in the presence of moisture.

6. The method of making porous rubber comprising treating a mixture of 100 grams latex, 12 grams flowers of sulphur and 30 ccms. of a 5% solution of calcium chloride with sulphur dioxide gas in such manner as to form a jelly containing substantially all the water and subjecting the jelly thus obtained to vulcanization in the presence of moisture.

7. Method of making rubber articles, characterized by aggregating the rubber particles of latex to the stage of formation of a reticulous body whereof the inter-aggregate pores are of microscopically visible filter-size and occupied by the latex liquid, curing the said body while the said liquid remains interstitially included, thereby fixing the rubber body in reticulous structure adapted to filtration of liquids.

8. Cured rubber article derived directly from latex and pervaded with substantially uniformly distributed pores capable of filtering liquids.

9. A rubber coagulum formed directly from latex by aggregation of its rubber particles, cured in the form of a liquid-filtering structure, being permeated with substantially uniformly distributed microscopically visible filter-size pores.

In testimony whereof I affix my signature.

HERMANN BECKMANN.